United States Patent [19]

Uchioke et al.

[11] Patent Number: 4,703,998
[45] Date of Patent: Nov. 3, 1987

[54] WATER-BLOCKED OPTICAL FIBER CABLE

[75] Inventors: Fumikiyo Uchioke; Ichiro Ogasawara; Shuzo Suzuki, all of Kanagawa, Japan

[73] Assignees: Sumitomo Electric Industries, Ltd, Osaka; Nippon Telegraph & Telephone Public Corporation, Tokyo, both of Japan

[21] Appl. No.: 708,769

[22] Filed: Mar. 5, 1985

[30] Foreign Application Priority Data

Mar. 6, 1984 [JP] Japan .............................. 59-32823[U]

[51] Int. Cl.⁴ ................................................. G02B 6/44
[52] U.S. Cl. .................................................. 350/96.23
[58] Field of Search ..................................... 350/96.23

[56] References Cited

U.S. PATENT DOCUMENTS 4,226,504 10/1980 Bellino ........................... 350/96.23
4,235,511 11/1980 Yonechi .......................... 350/96.23
4,401,366 8/1983 Hope ............................... 350/96.23

FOREIGN PATENT DOCUMENTS 2944997 8/1980 Fed. Rep. of Germany ... 350/96.23
56-78806 6/1981 Japan .............................. 350/96.23
58-207007 12/1983 Japan .............................. 350/96.23
1572877 8/1980 United Kingdom ............. 350/96.23

*Primary Examiner*—John Lee
*Attorney, Agent, or Firm*—Sughrue, Mion, Zinn, Macpeak & Seas

[57] ABSTRACT

A water-tight optical fiber cable constructed without the need of a viscous water-blocking compound. At least one water-absorbing fibrous braid is placed adjacent each optical fiber to absorb any water which may be present in or enter the cable. Additionally, one or more water-absorbing fibrous braids may be disposed between a tape layer and the surrounding protective sheath of the cable.

10 Claims, 7 Drawing Figures

WATER-BLOCKED OPTICAL FIBER CABLE

BACKGROUND OF THE INVENTION

The present invention relates to an improved optical fiber cable. More particularly, the invention relates to an optical fiber cable in which water is prevented from penetrating the fibers of the cable.

Although technical advances have come quickly in the art of optical fiber cables, such cables still often suffer an important drawback, namely, a deterioration of transmission characteristics due to penetration of water into the fibers of the cable. (This problem occurs too of course in electrical conductor type cables.)

In order to overcome this problem, it has been the practice to periodically pass dry air through the cables after they have been installed. Doing so, however, is expensive. Moreover, access to buried cables is often quite difficult.

Another approach has been to cover the fibers with a water-blocking compound such as has been used in electrical conductor cables. Such a compound, however, must be applied uniformly if it is to be fully effective. This proves difficult to accomplish in practice. A high degree of skill is required and it is necessary to provide a cushioning fabric for protecting the fibers and a grooved spacer or a tube to hold the fibers. Further, filling of the cable with the water-blocking compound while laying a cable is difficult and the compound itself can foul the work area if not handled properly. The compound, because it is quite viscous, cannot easily be removed from the cable. This makes the cable very difficult to splice.

SUMMARY OF THE INVENTION

Accordingly, it is an object of the present invention to provide an optical fiber cable in which the difficulties noted above have been eliminated but which achieves adequate water blocking for the fibers of the cable.

In accordance with the above and other objects, the invention, provides a water-blocked optical fiber cable wherein the water-blocking effect is achieved by the addition of at least one water-absorbing fibrous braid arranged adjacent to optical fiber(s) in the cable. If desired, further water-absorbing braids can be provided, for instance, braids disposed between the outer tape layer and the outer sheath of the cable. It is preferred that the fibrous braids have the ability to absorb water in an amount of at least more than 10 times their own volume and that each consist of one or more twisted fibers having a fineness of more than 200 denier.

DESCRIPTION OF THE PREFERRED EMBODIMENTS

Figure 1A:
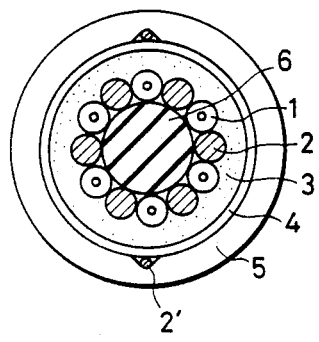
FIG. 1A is a cross-sectional view showing a first embodiment of the present invention.

Referring first to the cross-sectional view of FIG. 1A, there is shown therein an optical fiber cable constructed in accordance with a first embodiment of the present invention. This embodiment relates to a water-blocked optical cable of the cushion type which includes six optical fibers 1 interspaced by water-absorbing fibrous braids 2 and surrounded by a cushioning yarn 3. If desired, the cushioning yarn may be partially or completely replaced by water-absorbing fibrous braids.

Tape 4 is wound around the cable core and the resulting assembly is provided with a cable sheath 5. One or more water-absorbing fibrous braids 2' are provided between the tape 4 and the sheath 5. The braids 2' may be wrapped around the tape helically at a fairly large pitch, or they may be arranged to run along the length of the core. The fibers 1 and the braids 2 are disposed around a tension member 6 along the length of the cable.

Figure 1B:
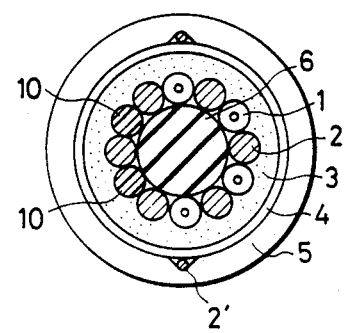
FIG. 1B is a cross-sectional view showing a modified embodiment of the first embodiment.

According to a modified embodiment shown in FIG. 1B, strings 10 are disposed instead of two of the fibers 1. The strings may be formed of polyethylene. This embodiment is effective for non-full arrangement of the optical fibers.

Figure 2A:
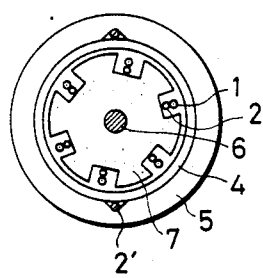
FIG. 2A is a cross-sectional view showing a second embodiment of the present invention.
Figure 3A:
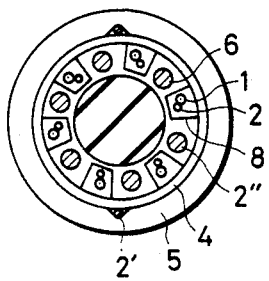
FIG. 3A is a cross-sectional view showing a third embodiment of the present invention.

In the embodiment of FIG. 2A, the teachings of the invention are applied to an optical fiber cable of the type employing a grooved spacer, while in the embodiment of FIG. 3A, the invention is applied to a cable employing tapered spacers.

In the embodiment of FIG. 2A, both an optical fiber 1 and a water-absorbing fibrous braid 2 are laid in each groove of the spacer 7. Of course, if a greater water-blocking ability is required, multiple water-absorbing fibrous braids may be provided in each groove. Each of the grooves is spirally formed.

As in the case of the first-discussed embodiment, tape 4 is wound around the cable core and the resulting assembly is provided with a cable sheath 5. One or more water-absorbing fibrous braids 2' are provided between the tape 4 and the sheath 5. The braids 2' may be wrapped around the tape helically at a fairly large pitch, or they may be arranged to run along the length of the core. The fibers 1 and the braids 2 are disposed around a tension member 6 along the length of the cable.

Figure 2B:
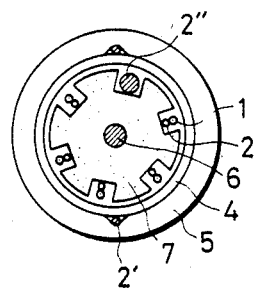
FIG. 2B is a cross-sectional view showing a modified embodiment of the second embodiment.

According to a modified embodiment shown in FIG. 2B, only a water-absorbing fibrous braid 2" is disposed in the spiral groove instead of the fiber 1 and braid 2.

In the case of the embodiment shown in FIG. 3A, a ring of six tapered spacers 8, each shaped in the form of a trough, surrounds a tension member 6. In each trough is disposed both an optical fiber 1 and a water-absorbing fibrous braid 2. Of course, multiple braids 2 can be used for a greater water-absorbing effect. Further, a water-absorbing fibrous braid 2" is provided between each spacer, thereby ensuring water tightness within the core of the cable.

Figure 3B:
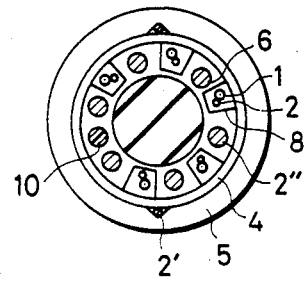
FIG. 3B is a cross-sectional view showing a modified embodiment of the third embodiment.

According to a modified embodiment shown in FIG. 3B, a string 10 is disposed between the tension member 6 and the tape 4 instead of the combination of U-shaped tapered spacer 8, optical fiber 1 and the braid 2. As a result, the string 10 is disposed, in circumferential direction, between the braids 2".

As in the case of the previously discussed embodiments, tape 4 is wound around the cable core and the resulting assembly is provided with a cable sheath 5. One or more water-absorbing fibrous braids 2' are provided between the tape 4 and the sheath 5. The braids 2' may be wrapped around the tape helically at a fairly large pitch, or they may be arranged to run along the length of the core.

Figure 4:
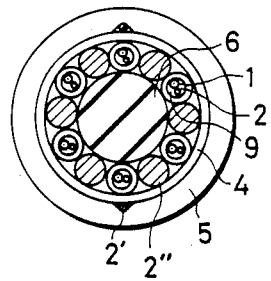
FIG. 4 is a cross-sectional view showing a fourth embodiment of the present invention.

The embodiment of FIG. 4 relates to cable of the tubular type. In this case, both an optical fiber 1 and a water-absorbing fibrous braid 2 are accomodated in each of six tubes 9 of the cable. Multiple water-absorbing fibrous braids in each tube 9 may be used if desired to increase the water-tightness of the cable. A water-absorbing fibrous braid 2" is provided between each tube to ensure the water-tightness of the cable.

As in the case of the previously discussed embodiments, tape 4 is wound around the cable core and the resulting assembly is provided with a cable sheath 5. One or more water-absorbing fibrous braids 2' are provided between the tape 4 and the sheath 5. The braids 2' may be wrapped around the tape helically at a fairly large pitch, or they may be arranged to run along the length of the core. The tubes 9 and the interspaced braids 2" are supported longitudinally on a tension member 6.

If desired, any of the above-described embodiments can be modified to provide an even greater degree of water tightness by employing one or more water-absorbing fibrous braids wound helically around the tension member 6 at a fairly larger pitch. Further, water-absorbing fibrous tape may be wound around the cable core instead of the tape 4 in each of the embodiments. Furthermore, according to the embodiments shown in FIGS. 1A, 1B, 3A, 3B and 4, at least one water-absorbing string is roughly wound around the tension member 6 in order to control water-absorbing property, and, if necessary, water-absorbing fibrous tape is used for the tape 4. Moreover, a conventional viscous water-blocking compound may be employed in addition to the water-absorbing fibrous braids. In that case, the water-blocking compound should be incorporated within the interior of the cable and the fibrous braids disposed around the cable core.

The water-absorbing fibrous braids used in the practice of the invention should have a capability to absorb water in an amount of more than 10 times their own volume and each should consist of one or more twisted fibers having a fineness of more than 200 denier. When such fibers absorb water, they expand to block water passage into the interior of the cable. As an example, the water-absorbing fibrous braids have a capability of absorbing water in an amount of 60 times their own volume, and each should consist of one or more twisted fibers having fineness of about 1800 denier.

The optical cable of the present invention can be fabricated without using equipment for filling the cable with a viscous water-blocking compound. As a further result, the cable of the invention can be produced at a higher speed than a cable of the prior art. Thus, the cost of manufacturing the cable of the present invention is reduced. Moreover, splicing and connecting operations performed on the cable of the invention are much easier than with the conventional cable.

This completes the description of the preferred embodiments of the invention. Although preferred embodiments have been described, it is believed that numerous modifications and alternations thereto would be apparent to one of ordinary skill in the art without departing from the spirit and scope of the invention.

What is claimed is:

1. An optical fiber cable comprising at least one optical fiber, at least one water-absorbing fibrous braid, at least one tension member, and a grooved spacer having a plurality of generally helically extending grooves arranged regularly therein, and wherein said at least one optical fiber comprises a plurality of optical fibers, said at least one water-absorbing fibrous braid comprises a plurality of water-absorbing fibrous braids and wherein at least one optical fiber and one water-absorbing fibrous braid are disposed in each groove.

2. The optical fiber cable of claim 1, wherein a single water-absorbing fibrous braid is disposed in each of said grooves.

3. The optical fiber cable of claim 1, wherein said water-absorbing fibrous braids are made of a material having an ability to absorb water in an amount of at least more than 10 times the volume thereof, and comprises at least one twisted fiber having a fineness of more than 200 denier.

4. An optical fiber cable comprising:
at least one optical fiber, at least one water-absorbing fibrous braid, at least one tension member comprising a central tension member, said at least one optical fiber comprising a plurality of optical fibers, said optical fibers are arranged around the periphery of said tension member, and said optical fiber cable further comprising a plurality of U-shaped spacer tapes arranged around the periphery of said central tension member.

5. The optical fiber cable of claim 4, wherein at least one of said optical fibers and one of said water-absorbing fibrous braids are disposed in each of said U-shaped spacer tapes.

6. The optical fiber cable of claim 5, further comprising a single water-absorbing fibrous braid disposed between each two adjacent U-shaped spacer tapes.

7. The optical fiber cable of claim 4, further comprising a string disposed between adjacent water-absorbing fibrous braids.

8. An optical fiber cable comprising: at least one optical fiber, at least one water-absorbing fibrous braid, a central tension member, said at least one optical fiber comprising a plurality of optical fibers arranged around the periphery of said central tension member, and a plurality of tubes, and at least one optical fiber and one water-absorbing fibrous braid disposed in each of said tubes.

9. The optical fiber cable of claim 8, wherein said cable further comprises a tape layer surrounding said optical fibers and a sheath surrounding said tape layer, and at least one water-absorbing fibrous braid disposed between said tape layer and said sheath.

10. The optical fiber cable of claim 9, wherein said tape layer is a water-absorbing fibrous tape.

* * * * *